US008864078B2

(12) United States Patent
Barbara et al.

(10) Patent No.: US 8,864,078 B2
(45) Date of Patent: Oct. 21, 2014

(54) METHOD OF DE-ICING THE LEADING EDGE OF AN AERODYNAMIC SURFACE AND AIRCRAFT IMPLEMENTING SUCH A METHOD

(75) Inventors: Olivier Barbara, Puylaurens (FR); David Donjat, Ayguevives (FR)

(73) Assignee: Airbus Operations SAS, Toulouse (FR)

( * ) Notice: Subject to any disclaimer, the term of this patent is extended or adjusted under 35 U.S.C. 154(b) by 1241 days.

(21) Appl. No.: 12/160,178

(22) PCT Filed: Jan. 15, 2007

(86) PCT No.: PCT/FR2007/000065
§ 371 (c)(1),
(2), (4) Date: Jul. 7, 2008

(87) PCT Pub. No.: WO2007/080333
PCT Pub. Date: Jul. 19, 2007

(65) Prior Publication Data
US 2009/0090814 A1    Apr. 9, 2009

(30) Foreign Application Priority Data

Jan. 16, 2006    (FR) .................................. 06 00350

(51) Int. Cl.
*B64D 15/04*    (2006.01)
*B64C 1/38*    (2006.01)
*B64C 21/10*    (2006.01)
*B64D 15/16*    (2006.01)
*B64D 33/02*    (2006.01)

(52) U.S. Cl.
CPC ................ *B64D 15/04* (2013.01); *B64C 21/10* (2013.01); *B64D 2033/0233* (2013.01); *Y02T 50/166* (2013.01); *B64D 15/16* (2013.01)
USPC .................................. 244/134 B; 244/117 A

(58) Field of Classification Search
USPC ........... 244/134 B, 130, 134 R, 134 E, 117 A
See application file for complete search history.

(56) References Cited

U.S. PATENT DOCUMENTS 3,578,264 A * 5/1971 Kuethe ........................ 244/200.1
5,901,928 A * 5/1999 Raskob, Jr. .................... 244/204
6,267,328 B1   7/2001 Vest
6,354,538 B1 * 3/2002 Chilukuri .................. 244/134 B

FOREIGN PATENT DOCUMENTS

FR        1 026 745      4/1953

OTHER PUBLICATIONS

International Search Report dated May 25, 2007 w/ English translation.
Written Opinion of the International Searching Authority with English translation.

* cited by examiner

*Primary Examiner* — Brian M O'Hara
(74) *Attorney, Agent, or Firm* — Dickinson Wright PLLC

(57) ABSTRACT

According to the invention, on at least one of the faces (1E, 1I) of said leading edge (1), forward of the partition (3), an action is exerted on the fluid flow (EF) so as to cause the latter to switch from the laminar state (EFL) to the turbulent state (EFT) in order to increase the thermal exchanges and minimize the thermal stresses on said leading edge.

3 Claims, 2 Drawing Sheets

METHOD OF DE-ICING THE LEADING EDGE OF AN AERODYNAMIC SURFACE AND AIRCRAFT IMPLEMENTING SUCH A METHOD

The present invention relates to the deicing of the leading edge of aircraft aerodynamic surfaces, such as wings, empennages or engine nacelles.

It is known that, if required (prevention against the formation of ice or elimination of ice already formed), the leading edge of such aerodynamic surfaces is deiced by warming with pressurized hot air, tapped off from at least one of the engines of the aircraft and conveyed into the interior of said leading edge by a pressurized hot air circulation circuit.

For this purpose, an aerodynamic surface such as this comprises, in a known manner, a hollow leading edge closed, at the rear, by an internal partition (or frame) connecting the bottom face and top face of said leading edge, at least one orifice being designed to place said leading edge in communication with the exterior, and at least one hot air feed pipe is envisaged, able to be joined, on one side, to said pressurized hot air circulation circuit and, on the other side, to at least one injector injecting a stream of said pressurized hot air into said leading edge.

Thus, said hot air stream circulates in said leading edge while warming it before escaping to the exterior through said communication orifice.

In practice, in a known deicing system such as this, one is confronted with the difficulty that the flow rate and temperature of the hot air tapped off from said engine vary significantly as a function of the engine output: for example, when the aircraft is on standby on the ground and the engine output is low, the flow rate and temperature of said hot air tapped off are also at a low level, while, when the aircraft is climbing, the output of the engine is high and the flow rate and temperature of said hot air tapped off also exhibit high values.

Now, a known deicing system such as this must be effective in both the extreme cases mentioned above. It follows from this that, said deicing system being by construction designed to be effective at low output, said leading edge might be damaged, if not destroyed, for high outputs of said engine.

To solve this problem, it would of course be possible to use refractory materials to at least partially make the leading edge, or indeed envisage structural reinforcements of the latter. However, those would be expensive solutions, in addition increasing the mass of said leading edge.

The object of the present invention is to remedy the drawbacks mentioned above in a simple and effective manner.

To this end, according to the invention, the method for protecting the hollow leading edge of an aircraft aerodynamic surface against the damaging effects of excessively high temperatures of the hot deicing air circulating inside said leading edge, said leading edge being closed, at the rear, by a partition connecting the top face and bottom face of said leading edge and said hot deicing air being tapped off from at least one engine of said aircraft, is noteworthy in that, on at least one of said faces of the leading edge, forward of said partition, an action is exerted on the fluid flow so as to cause the latter to switch from the laminar state to the turbulent state.

The present invention results from the following two findings noted by the applicant:
when hot spots appear in such a leading edge, they are situated in the vicinity of the junction between said internal partition and the faces of said leading edge; and
in the vicinity of such a junction, the fluid flow on said faces of the leading edge is laminar.

Thus, by acting on said fluid flow forward of said partition (that is to say upstream when considering this fluid flow) so as to cause the latter to switch from the laminar state to the turbulent state, the coefficient of heat exchange between said leading edge and said fluid flow, forward of and at the level of said hot spots, is greatly increased, thereby making it possible to cool and protect said leading edge at locations sensitive to excessively high temperatures.

It will be noted that, in the aircraft takeoff phase, the fluid flow on said leading edge being all the more significant the higher the speed of the aircraft, the effectiveness of the cooling of said leading edge increases with this speed, and therefore with the output of said engine. On the other hand, when there is no fluid flow on the leading edge (aircraft stationary on the ground) or when this fluid flow is weak, the implementation of the invention is neutral and the deicing remains optimal for these conditions.

When said aerodynamic surface is a wing or an empennage, it is generally advantageous to implement the invention both on the top face and on the bottom face of said leading edge.

On the other hand, when said aerodynamic surface is an engine nacelle, it is generally sufficient to implement the invention only on the top face of the leading edge, the bottom face exhibiting weaker thermal stresses.

In a particularly simple and advantageous implementation of the invention, the face (or faces) of the leading edge is (or are) rendered rough at least in part. This action could be effected by shot-blasting (or by any other analogous procedure) of said face (or faces).

However, it is preferable to effect this action by adding a rough band, for example of the abrasive type, to said face (or faces) of the leading edge, at least substantially parallel to said partition. A rough band such as this can be installed easily by riveting, welding, adhesive bonding, etc. Moreover, the use of such a band exhibits the advantage that its position on the leading edge can be finely adjusted. Furthermore, such a band has no impact on the process for fabricating the leading edge and demands neither material of any particular nature, nor structural reinforcement, to make the latter.

The present invention relates, moreover, to an aircraft comprising:
at least one engine;
at least one aerodynamic surface provided with a leading edge sensitive to icing, said leading edge being hollow and closed at the rear by a partition connecting the top face and bottom face of said leading edge; and
at least one pressurized hot air feed pipe joined, on one side, to said engine and, on the other side, to at least one injector injecting a stream of said pressurized hot air into said leading edge, so that said hot air stream circulates in said leading edge while warming it,
said aircraft being noteworthy in that at least one of said faces of said leading edge is rough forward of said partition, so as to render the fluid flow on said face turbulent.

Preferably, the roughness of said face originates from the fact that the latter carries a rough band added at least substantially parallel to said partition.

The figures of the appended drawing will elucidate the manner in which the invention may be effected. In these figures, identical references designate similar elements.

Figure 1:
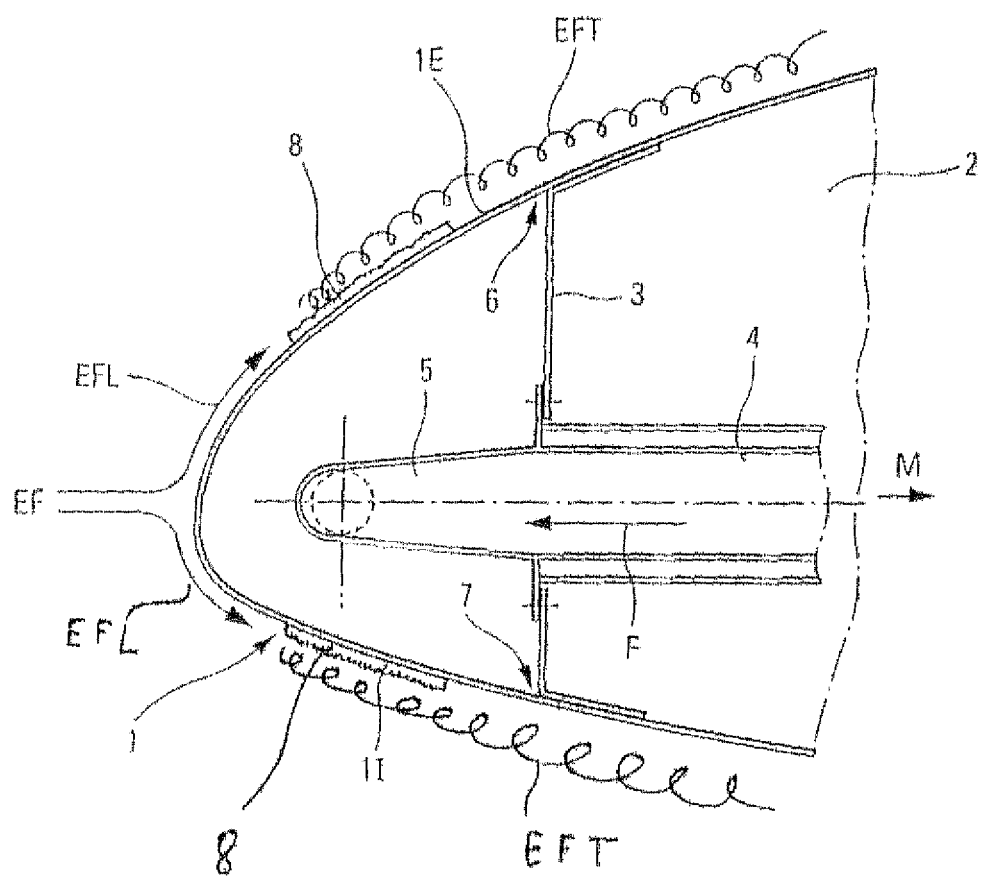
FIG. 1 is a schematic view, in cross section along the line I-I of FIG. 2, of a leading edge enhanced according to the invention.
Figure 2:
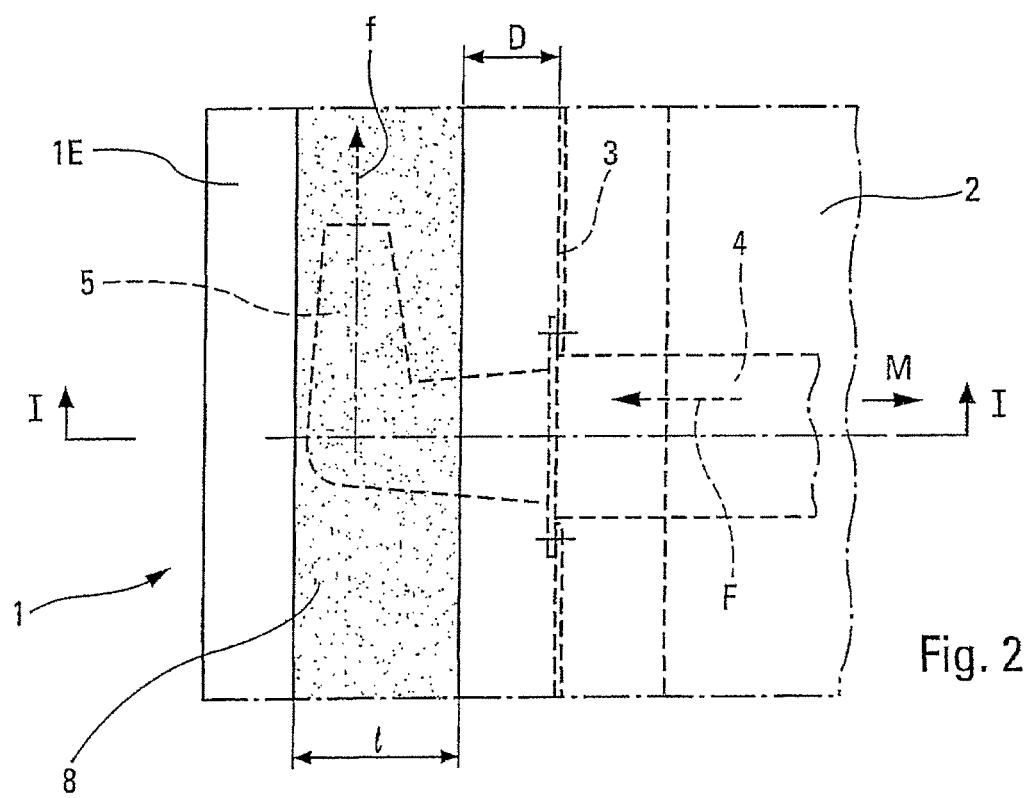
FIG. 2 is a view from above of the leading edge of FIG. 1.

In the schematic example of FIGS. 1 and 2 is represented the leading edge 1 of an aerodynamic surface 2 of an aircraft (not represented). The aerodynamic surface 2 is, for example, the nacelle of an engine M (not represented) of said aircraft.

The leading edge 1 is hollow and it is closed at the rear by a partition 3 connecting the top face 1E and the bottom face 1I of said leading edge.

Inside the aerodynamic surface 2 is envisaged a pressurized hot air feed pipe 4 joined on one side to said engine M, from which said hot air is tapped off (see the arrow F). On the other side, said pipe 4 is joined, across the partition 3, to an injector 5 injecting a pressurized hot air stream into said leading edge 1 (see the arrow f). Said hot air stream circulates inside said leading edge 1, while warming it so as to eliminate any ice formation on its top face 1E and/or bottom face 1I, and is then vented to the atmosphere through one or more orifices (not represented).

If the output of the engine M is high, the flow rate and the temperature of the hot air streams F and f are significant and hot spots 6 and/or 7 might appear in said leading edge 1, at the junction between the partition 3, on the one hand, and the top face 1E and/or the bottom face 1I of the leading edge 1, on the other hand.

In the example represented in FIGS. 1 and 2, it has been assumed that the hot spot 7, at the level of the bottom face 1I, could not have any damaging action on the leading edge 1, but that, conversely, the hot spot 6, at the level of the top face 1E, could damage, and even destroy, said leading edge 1.

Also, according to the invention, on said top face 1E, forward of the partition 3, is installed a band 8 of a rough material, parallel to said partition. The fixing of the rough band 8 on the top face 1E can be effected by any known means, such as adhesive bonding, riveting, welding, etc. The rough band 8 can be of the type of the known industrial abrasives, for example based on silicon carbide.

On account of the presence of the band 8 on the top face 1E, the fluid flow EF on the latter switches from the laminar state EFL (forward of the band 8) to the turbulent state EFT (from the band 8 onwards). Therefore, at the level of the hot spot 6, favorable conditions of thermal convection between the top face 1E and the exterior environment are created, making it possible to protect said top face 1E against excessively high temperatures.

It will readily be understood that the width l of the band 8, the distance D of the latter from the partition 3, as well as the granulometry of said rough band, are parameters that make it possible to finely adjust the action of said band on the flow EF.

It will be understood, moreover, that if the hot spot 7 were dangerous for the integrity of the leading edge 1, it would be possible to install on the bottom face 1I a rough band similar to the band 8 added to the top face 1E.

The invention claimed is:

1. A method for reducing hot spot formation in a hollow leading edge of an aerodynamic surface of an aircraft, said hollow leading edge being closed at a rear position by an internal partition connecting a top face and a bottom face of said hollow leading edge, said method comprising:
    flowing a fluid flow over a rough band added to at least one of said top and bottom faces of the hollow leading edge, forward of said partition, said rough band consisting of an abrasive and being at least substantially parallel to said partition; and
    circulating hot deicing air, tapped off from at least one engine of said aircraft, inside said hollow leading edge at flow rate and temperature conditions that produce the hot spot formation at a junction between the internal partition and at least one of the top face and bottom face of the hollow leading edge,
    wherein
    the hot spot formation is reduced in the hollow leading edge by configuring the rough band at a distance D forward of the partition and flowing the fluid flow external to the hollow leading edge and over the rough band, with the fluid flow switching from a laminar state forward of the band to a turbulent state downward of the band, and the switch to turbulent flow producing a thermal convection between the at least one of the top face and bottom face of the hollow leading edge and providing a coefficient of heat exchange between the at least one of the leading edge and the fluid flow downward from the band, at the location of the hot spot formation, that is greater than that between the leading edge and the fluid flow forward of the band.

2. The method as claimed in claim 1,
    wherein the rough band is added to both the top face and the bottom face of said hollow leading edge and the aerodynamic surface is a wing or an empennage.

3. The method as claimed in claim 1,
    wherein the rough band is added to the top face of said hollow leading edge and the aerodynamic surface is a wing or an engine nacelle.

\* \* \* \* \*